US010572537B2

(12) United States Patent
Inoue

(10) Patent No.: US 10,572,537 B2
(45) Date of Patent: Feb. 25, 2020

(54) EFFICIENT GRAPH OPTIMIZATION

(71) Applicant: INTERNATIONAL BUSINESS MACHINES CORPORATION, Armonk, NY (US)

(72) Inventor: Hiroshi Inoue, Tokyo (JP)

(73) Assignee: International Business Machines Corporation, Armonk, NY (US)

(*) Notice: Subject to any disclaimer, the term of this patent is extended or adjusted under 35 U.S.C. 154(b) by 872 days.

(21) Appl. No.: 15/098,022

(22) Filed: Apr. 13, 2016

(65) Prior Publication Data
US 2017/0300593 A1 Oct. 19, 2017

(51) Int. Cl.
G06F 16/901 (2019.01)
G06F 16/23 (2019.01)
(52) U.S. Cl.
CPC ...... G06F 16/9024 (2019.01); G06F 16/2372 (2019.01)
(58) Field of Classification Search
CPC .... G06F 16/80; G06F 16/9024; G06F 16/901; G06F 16/2372
USPC ........................................ 707/798
See application file for complete search history.

(56) References Cited

U.S. PATENT DOCUMENTS

| 8,838,579 | B2 | 9/2014 | Weyerhaeuser et al. |
| 2005/0050016 | A1* | 3/2005 | Stanoi ................. G06F 16/9027 |
| 2006/0146733 | A1* | 7/2006 | Alicherry ............... H04L 45/00 370/255 |
| 2008/0281864 | A1* | 11/2008 | Itai ......................... G06F 19/26 |
| 2012/0278261 | A1* | 11/2012 | Lin ......................... G06N 5/003 706/12 |
| 2013/0096967 | A1* | 4/2013 | Simitsis ................. G06Q 10/04 705/7.11 |
| 2016/0344618 | A1* | 11/2016 | Oprea ..................... H04L 45/40 |
| 2018/0060448 | A1* | 3/2018 | Miyamoto ........... G06K 9/6218 |

* cited by examiner

Primary Examiner — Michael Pham
(74) Attorney, Agent, or Firm — Tutunjian & Bitetto, P.C.; Vazken Alexanian

(57) ABSTRACT

A method includes obtaining a graph including a plurality of nodes and a plurality of paths between the nodes, generating a data structure in which, for each node pair of the plurality of nodes, a count of the number of paths of length S between the node pair is stored in association with the length S, obtaining a modification of the graph, and estimating, based on the data structure and the modification, a change in a characteristic of the graph caused by the modification. The graph may represent an arrangement of elements in a system, and the characteristic may be indicative of performance of the system.

20 Claims, 12 Drawing Sheets

Index($S, n_0, n_1$) for $S_{max}$ = 3
$n_0$ = A
$n_1$ = B

- Index(1,A,B) = 0
- Index(2,A,B) = 1 → 0
- Index(3,A,B) = 2

EFFICIENT GRAPH OPTIMIZATION

BACKGROUND

Technical Field

The present invention relates to efficient graph optimization.

Related Art

Optimization of a graph, e.g. by reducing average shortest path length, is a fundamental problem in graph theory. Conventional approaches are based on the calculation of the objective function itself, e.g. average shortest path length. However, as a practical matter, the computation time of the objective function can be prohibitive for large graphs.

SUMMARY

Therefore, it is an object of an aspect of the innovations herein to provide a method capable of overcoming the above drawbacks accompanying the related art. The above and other objects can be achieved by the combinations recited in the claims. A first aspect of the innovations herein may include a method including obtaining a graph including a plurality of nodes and a plurality of paths between the nodes, generating a data structure in which, for each node pair of the plurality of nodes, a count of the number of paths of length S between the node pair is stored in association with the length S, obtaining a modification of the graph, and estimating, based on the data structure and the modification, a change in a characteristic of the graph caused by the modification. The graph may represent an arrangement of elements in a system, and the characteristic may be indicative of performance of the system.

A second aspect of the innovations herein may include a computer readable storage medium having instructions embodied therewith, the instructions executable by a processor to cause the processor to perform operations including obtaining a graph including a plurality of nodes and a plurality of paths between the nodes, generating a data structure in which, for each node pair of the plurality of nodes, a count of the number of paths of length S between the node pair is stored in association with the length S, obtaining a modification of the graph, and estimating, based on the data structure and the modification, a change in a characteristic of the graph caused by the modification. The graph may represent an arrangement of elements in a system, and the characteristic may be indicative of performance of the system.

A third aspect of the innovations herein may include an apparatus including the above computer readable storage medium of the second aspect and a processor operable to execute the instructions.

The summary clause does not necessarily describe all of the features of the embodiments of the present invention. The present invention may also be a combination or subcombination of the features described above, including a combination of features from two or more of the aspects described above. The above and other features and advantages of the present invention will become more apparent from the following description of the embodiments, taken in conjunction with the accompanying drawings.

DETAILED DESCRIPTION

Hereinafter, example embodiments of the present invention will be described. The embodiments should not be construed as limiting the scope of the invention, which is defined by the claims. The combinations of features described in the embodiments are not necessarily essential to the invention.

Figure 1:
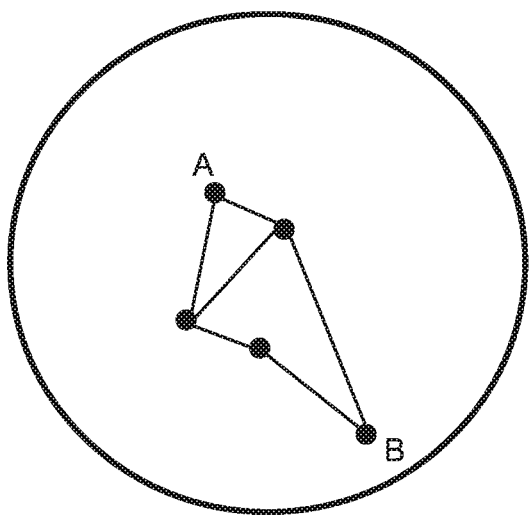
FIG. 1 shows an example graph undergoing the addition of an edge, along with a corresponding update of a data structure.
Figure 1:
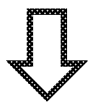
Figure 1:
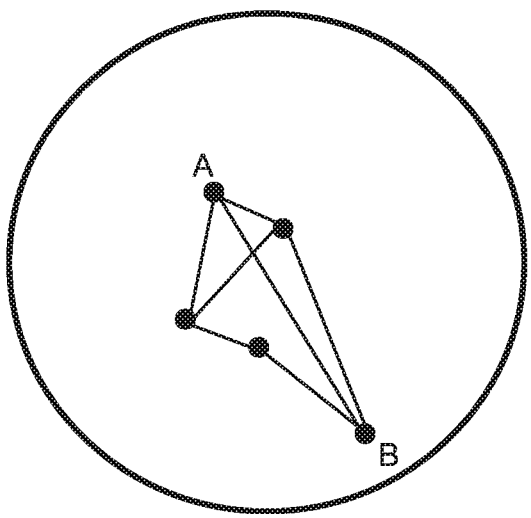

FIG. 1 shows an example graph undergoing the addition of an edge, along with a corresponding update of a data structure. In the upper portion of FIG. 1, an initial state of the graph is shown, in which it can be seen that the graph includes five nodes (represented as points) and six edges (represented as line segments) between the nodes, and that several paths can be counted between node A and node B. In FIG. 1, many other nodes and many other edges that do not relate to the paths between nodes A and B are omitted. If a path is defined such that each node on the path can be visited once at most, it can be seen that there are four paths between node A and node B. In the lower portion of FIG. 1, below the arrow, a subsequent state of the graph is shown, after the graph was modified to add an edge between node A and node B. In the modified graph, it can be seen that there are five paths between node A and node B.

On the right side of FIG. 1, a data structure "Index($S,n_0,n_1$)" is shown in which, for each node pair ($n_0,n_1$) of the plurality of nodes, a count of the number of paths of length S between the node pair is stored in association with the length S. In the example of FIG. 1, the data structure only includes counts of the number of paths of length S for $S \leq a$ predetermined upper limit $S_{max}$, in this case 3. Thus, for ($n_0,n_1$)=(A,B), the data structure stores three values: the number of paths between A and B of path length 1, the number of paths between A and B of path length 2, and the number of paths between A and B of path length 3. Counts of the number of 4-length or greater paths are excluded from the data structure. The specific values of the data structure listed correspond to the initial and subsequent states of the graph shown in FIG. 1, with the arrow "→" showing the change caused by the addition of the edge between nodes A and B. As can be seen, one 2-length path and two 3-length paths exist before and after the modification, while the modification introduces a single 1-length path. Note that this modification reduces the shortest path length between nodes A and B by 1 (from length 2 to length 1).

Figure 2:
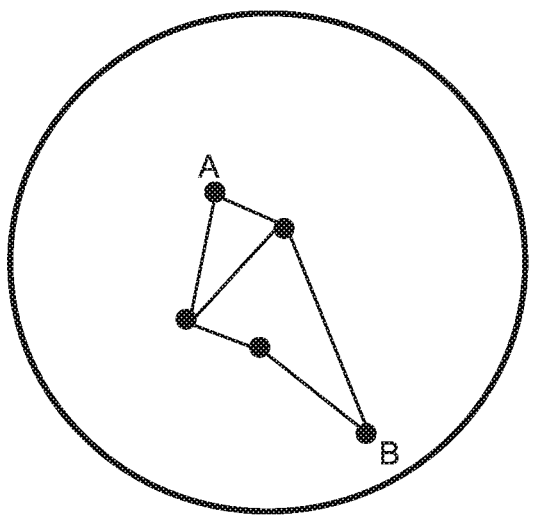
FIG. 2 shows an example graph undergoing the subtraction of an edge, along with a corresponding update of a data structure.
Figure 2:
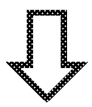
Figure 2:
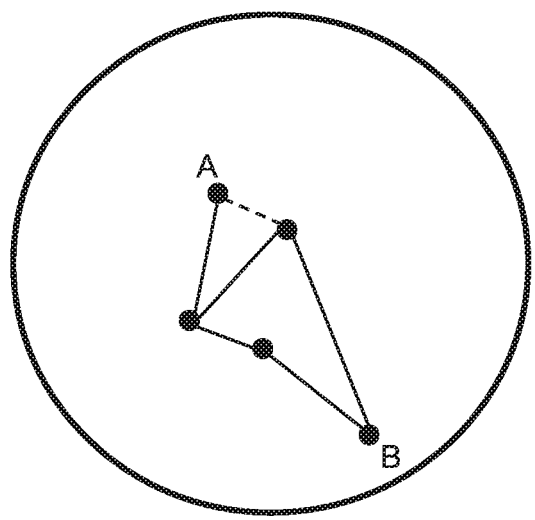

FIG. 2 shows the same example graph as in FIG. 1, this time undergoing the subtraction of an edge, along with a corresponding update of a data structure. The subtracted edge is indicated in the subsequent state of the graph by a dashed line. As can be seen, zero 1-length paths and two 3-length paths exist before and after the modification, while the modification eliminates the only 2-length path. Note that this modification increases the shortest path length between nodes A and B by 1 (from length 2 to length 3).

FIG. 3 shows once again the same example graph as in FIG. 1, this time undergoing a combined modification including the addition of the edge of FIG. 1 and the subtraction of the edge of FIG. 2, along with a corresponding update of a data structure. As can be seen, two 3-length paths exist before and after the modification, while the modification eliminates the only 2-length path and introduces a single 1-length path. Note that this modification reduces the shortest path length between nodes A and B by 1 (from length 2 to length 1). Thus, it can be seen that the effect that a combined modification has on the shortest path length is not necessarily equal to the sum of the effects of the constituent modifications. However, the change of counts for each path length can be calculated by summing additions and subtractions caused by all added and subtracted edges in the combined modification.

Figure 3:
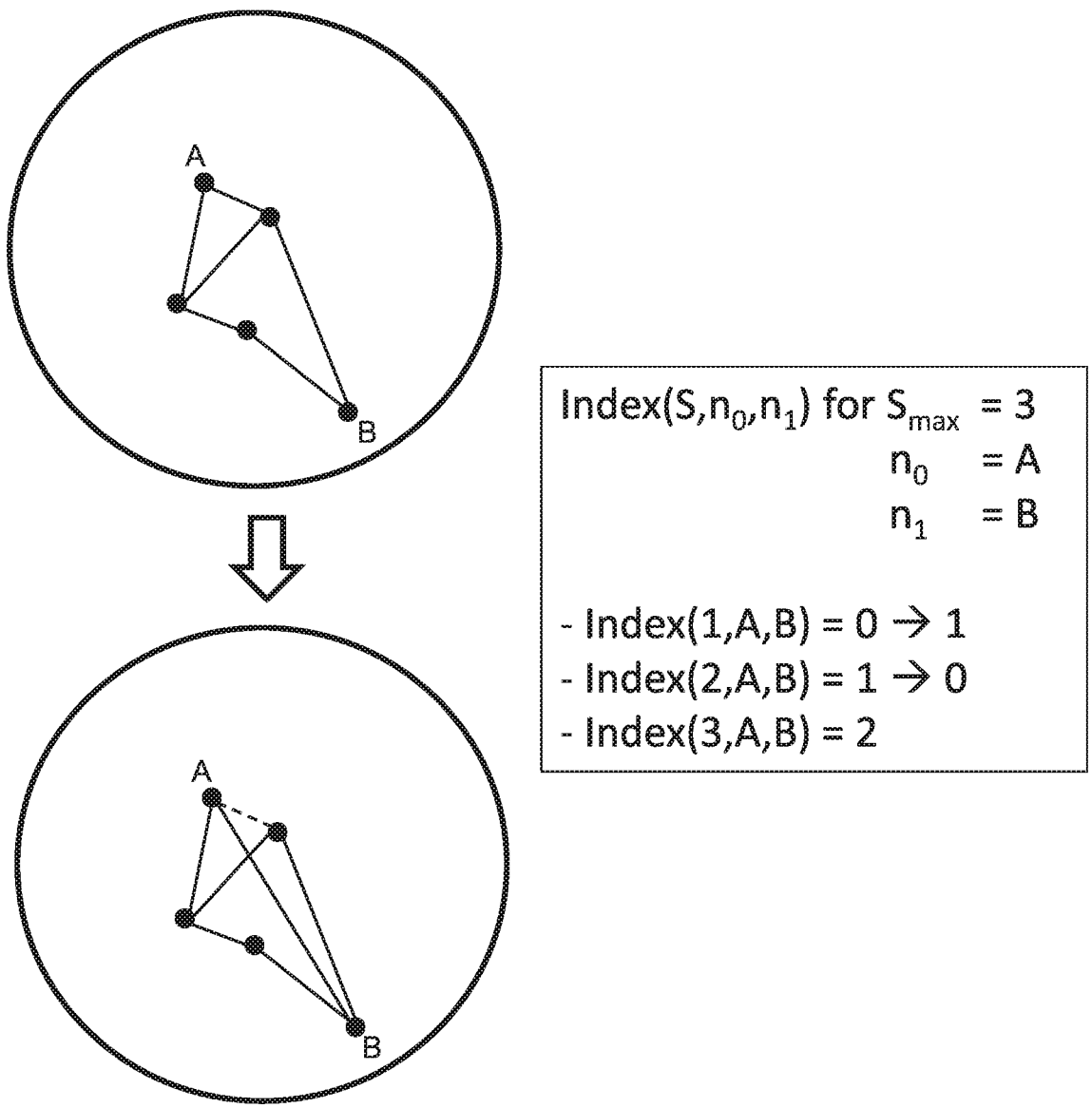
FIG. 3 shows an example graph undergoing a combined modification including the addition of an edge and the subtraction of an edge, along with a corresponding update of a data structure.

FIGS. 1-3 introduce the basic idea of the data structure Index(S,$n_0$,$n_1$). As will become apparent from the embodiments described in the remainder of this description, the data structure Index(S,$n_0$,$n_1$) can serve as a tool for estimating the effects of modifications on meaningful, performance-indicative characteristics of graphs. Conventionally, when one or more candidate modifications are evaluated with respect to a graph being generated or updated, an objective function that matches the purpose of the graph is calculated for each modification in order to determine whether or by how much the modification will improve the graph with respect to its purpose (e.g. by reducing or minimizing average shortest path length). For example, if the objective function is defined to be a function of the average shortest path length, calculating the objective function requires consideration of all paths between all node pairs to measure the shortest path lengths of all node pairs. Therefore, calculating the objective function entails a massive computational cost. Through the use of the data structure Index(S,$n_0$,$n_1$), it may become possible to optimize a graph by evaluating one or more candidate modifications while avoiding a time-consuming calculation of an objective function of the graph or improving the efficiency of such calculation.

Figure 4:
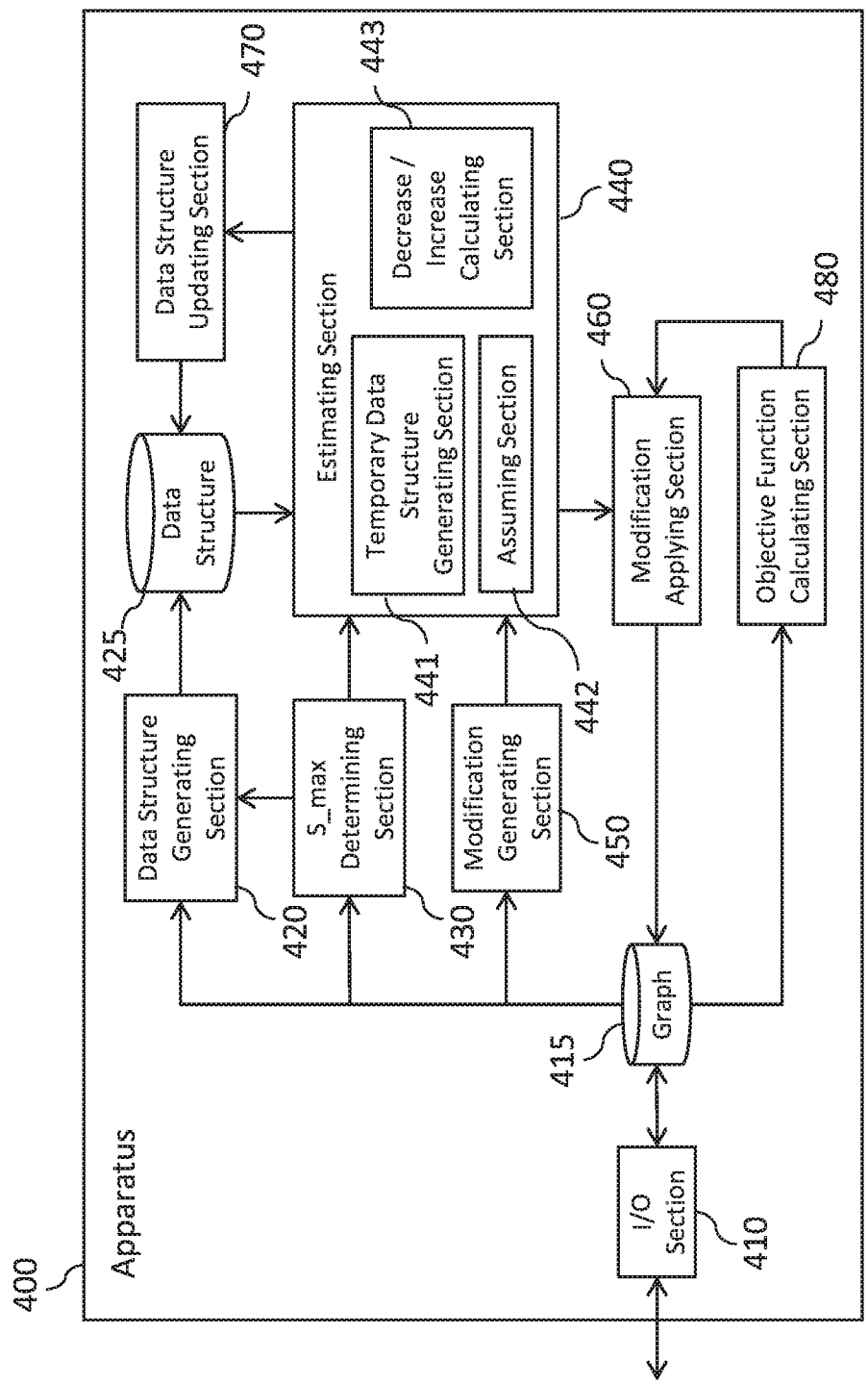
FIG. 4 shows an apparatus 400 according to an embodiment of the present invention.

FIG. 4 shows an apparatus 400 according to an embodiment of the present invention. The apparatus 400 obtains a graph and generates a data structure for the graph such as the data structure Index(S,$n_0$,$n_1$) described above. Using the data structure, the apparatus 400 estimates a change in a characteristic of the graph caused by a modification of the graph. If the characteristic of the graph is indicative of performance of a system represented by the graph, the estimated change provides information about whether the modification improves the performance of the system and, for example, whether the modification should be applied to the graph or discarded. Thus, on the basis of such estimated change, the apparatus 100 may support the optimization of the graph and underlying system. The apparatus 100 includes an input/output (I/O) section 410, a graph storage 415, a data structure generating section 420, a data structure storage 425, an $S_{max}$ (or S_max) determining section 430, an estimating section 440, a modification generating section 450, a modification applying section 460, a data structure updating section 470, and an objective function calculating section 480.

The I/O section 410 obtains a graph including a plurality of nodes and a plurality of paths between the nodes. The paths between nodes may consist of a series of one or more edges and intervening nodes as described in reference to the example graph of FIGS. 1-3. The graph may be undirected, such that no distinction exists between the two nodes connected by an edge, i.e. the edges have no "beginnings" and "endings." For simplicity, this disclosure describes undirected graphs as examples. However, the graph may also be directed, with each edge defined in a single direction between a "beginning" node and an "ending" node or in both directions. If the graph is directed, the data structures generated by the apparatus 400 and the modifications to add and/or remove edges may define directions accordingly, but otherwise the apparatus 400 may function in essentially the same way. The graph may represent an arrangement of elements in a system. Non-limiting examples of systems include a computer system in which the elements may be processing elements, a communication network in which the elements may be communicating devices, a query execution system, a real or virtual structure or model, a process flow in which the elements are computation, decision, or other process nodes, or generally any spatial, temporal, or conceptual arrangement of components or items of information having a real-world application in a technical, business, or other practical setting.

In the example of the apparatus 400 shown in FIG. 4, the data input section 410 obtains the graph from outside the apparatus 400. For example, the graph can be obtained from an external storage or obtained from a computer or server through a network such as the Internet, WAN, and/or LAN. Alternatively, the graph may be created within the apparatus 400, e.g. by a modification to add a first edge.

The I/O section 410 may also output the graph after one or more modifications have been applied to the graph by the apparatus 400. The graph may be output to an external storage or may be output to a computer or server through a network such as the Internet, WAN, and/or LAN. The outputting of the graph may include storing, uploading to a server, printing, displaying on a screen, or otherwise making the graph available for viewing or analysis, including in relation to a user query as an intermediate step in a process performed by the apparatus 400.

The I/O section 410 may receive and/or output data including the graph and/or any associated information through any combination of input device(s) and output device(s). For example, the I/O section 410 may be configured to receive mouse input, keyboard input, touchscreen input, eye tracking input, voice commands, and/or gestures and may be configured to provide still or moving visual output, audio output, or vibration or other touch-based output via a screen, speaker, printer, or other output device.

The I/O section 410 may receive and/or output the data from or to a remote user terminal or a remote user device.

The graph storage 415 stores the graph obtained by the I/O section 410. The graph storage 415 may store the graph after one or more modifications have been applied to the graph by the apparatus 400. The graph storage 415 may store modified versions of the graph in place of previous versions or in addition to previous versions.

The data structure generating section 420 generates a data structure in which, for each node pair of the plurality of nodes included in the graph, a count of the number of paths of length S between the node pair is stored in association with the length S. The data structure may be, for example, the data structure Index($S,n_0,n_1$) described above. If the graph is undirected, the data structure Index($S,n_0,n_1$) may be generated such that, for any two nodes A and B, the data structure Index($S,n_0,n_1$) includes entries for only one of $(n_0,n_1)$=(A,B) and $(n_0,n_1)$=(B,A), so as to avoid duplicate entries. On the other hand, if the graph is directed, Index($S,n_0,n_1$) may be different for $(n_0,n_1)$=(A,B) and $(n_0,n_1)$=(B,A). The length S of a path may be determined under the assumption that each edge has a length of 1 as in FIGS. 1-3. Alternatively, edges and/or nodes (including those added by a modification) may themselves be assigned lengths or weights, in which case the length S of a path may be a sum of the lengths or weights of each edge and/or node in the path. Non-natural (e.g. fractional) path lengths S may be converted to natural numbers by rounding or normalization (e.g. by multiplying all path lengths by some common value). The data structure may be generated so as to only include counts of the number of paths of length S for S≤a predetermined upper limit $S_{max}$. The predetermined upper limit $S_{max}$ may be set by a user or may be determined by the apparatus 400.

The count of the number of paths of length S between a node pair may be represented in the data structure by fewer bits than are required for representing a maximum value of the count. For example, in a graph in which each node has at most four connections, the maximum count of the number of paths of length 1 between a node pair is 1, the maximum count of the number of paths of length 2 is 4, the maximum count for length 3 is 16, etc. In this example, five bits (representing a number from 0 to 31) are required for representing the maximum count for length 3. By setting a limit to the number of bits used to represent the count in the data structure, e.g. three bits (representing a number from 0 to 7), the count for length 3 in the data structure can be capped, e.g. at 7, with a count of 7 representing any count from 7 to 16. The same limit may be imposed for the entire data structure or different limits may be imposed for different path lengths S.

The $S_{max}$ determining section 430 determines $S_{max}$. For example, the $S_{max}$ determining section 430 may determine $S_{max}$ based on the diameter of the graph, i.e. the largest path length between two nodes. Through modifications to the graph, the diameter of the graph may change. The $S_{max}$ determining section 430 may determine $S_{max}$ based on the initial diameter of the graph or may periodically update a previously input or determined $S_{max}$ based on the changed diameter. If $S_{max}$ changes, the $S_{max}$ determining section 430 may issue a notification to the data structure generating section 420 to expand or shrink the data structure accordingly. The $S_{max}$ determining section 430 may determine $S_{max}$ so as to be less than the diameter of the graph. In general, a larger $S_{max}$ results in a more accurate estimation by the apparatus 400, while a smaller $S_{max}$ reduces computation time and memory usage. If $S_{max}$ is too small relative to the diameter of the graph, the estimation may not work. If $S_{max}$ is set by a user instead of determined by the apparatus 400, or if no upper limit $S_{max}$ is used by the data structure generating section 420 in generating the data structure, the $S_{max}$ determining section 430 may be omitted.

The estimating section 440 obtains a modification of the graph and estimates, based on the data structure and the modification, a change in a characteristic of the graph caused by the modification. If the graph represents an arrangement of elements in a system, the characteristic may be indicative of performance of the system. The modification of the graph may be provided by a user or may be determined by the apparatus 400 (e.g. by the modification generating section 450). The modification may be to add one or more edges to the graph, to remove one or more edges from the graph, or to add one or more edges and remove one or more edges from the graph. The modification may further add and/or remove one or more nodes from the graph. In a case where the edges and/or nodes may themselves be assigned lengths or weights, the modification may adjust the lengths or weights. The estimating section 440 includes a temporary data structure generating section 441, an assuming section 442, and an decrease/increase calculating section 443.

The temporary data structure generating section 441 generates a temporary data structure in which, for each node pair connected by a new edge added by the modification, a count of the number of paths of length S between the node pair and through the new edge is stored as a positive value in association with the length S or added to an existing value associated with the length S and/or, for each node pair connected by an old edge removed by the modification, a count of the number of paths of length S between the node pair and through the old edge is stored as a negative value in association with the length S or subtracted from an existing value associated with the length S. Like the data structure generated by the data structure generating section 420, the temporary data structure may be generated so as to only include counts of the number of paths of length S for S≤$S_{max}$. For example, the temporary data structure generating section 441 may generate a temporary data structure Temp_Index($S,n_0,n_1,n_2,n_3$) similar in form to Index($S,n_0,n_1$) but with additional arguments ($n_2,n_3$) defining a node pair connected by a new edge added by the modification or an old edge removed by the modification. The temporary data structure generation section 441 may generate the temporary data structure Temp_Index($S,n_0,n_1,n_2,n_3$) such that the temporary data structure Temp_Index($S,n_0,n_1,n_2,n_3$) only includes entries for paths that connect $n_0,n_1$ through the new edge or old edge connected by the node pair ($n_2,n_3$)=(X,Y). If the graph is undirected, the data structure Temp_Index($S,n_0,n_1,n_2,n_3$) may be identical to the data structure Temp_Index($S,n_0,n_1,n_3,n_2$). That is, an edge connected by the node pair ($n_2,n_3$) and an edge connected by the node pair ($n_3,n_2$) may have the same meaning. On the other hand, if the graph is directed, Temp_Index($S, n_0,n_1,n_3,n_2$) may be different for ($n_2,n_3$) and ($n_3,n_2$). As with Index ($S,n_0,n_1$), if edges and/or nodes are assigned lengths or weights, the length S of a path in Temp_Index($S,n_0,n_1,n_2,n_3$) may be a sum of the lengths or weights of each edge and/or node in the path.

If the modification includes more than one addition or removal of an edge, the temporary data structure generating section 441 may generate the temporary data structure in an iterative fashion, such that the counts associated with each subsequent added/removed edge are added to or subtracted from the counts in the temporary data structure. For example, after generating a temporary data structure Temp_Index($S,n_0,n_1,n_2,n_3$) for a first new (added) edge or old (removed) edge connected by the node pair $(n_2,n_3)=(X_1, Y_1)$, the temporary data structure generating section 441 may update Temp_Index$(S,n_0,n_1,n_2,n_3)$ by adding counts associated with a second new (added) edge connected by the node pair $(n_2,n_3)=(X_2, Y_2)$ or by subtracting counts associated with a second old (removed) edge connected by the node pair $(n_2,n_3)=(X_2, Y_2)$. In this way, a modification including any number of added and/or removed edges can be represented by the temporary data structure Temp_Index$(S,n_0,n_1,n_2,n_3)$, with $(n_2,n_3)$ representing multiple node pairs added or removed by the modification.

The temporary data structure may be temporary in the sense that it is not stored in the data structure storage 425. Alternatively, the temporary data structure may be stored in the data structure storage 425 or elsewhere, for example, to maintain log information.

The assuming section 442 determines, by assumption, an unknown shortest path length between a node pair prior to a modification or an unknown shortest path length between a node pair after a modification. For example, the data structure stored in the data structure storage 425 may only include counts of the number of paths of length S for S≤a predetermined upper limit $S_{max}$, which may result in a node pair having no counts in the data structure (e.g. if all paths between the node pair have length greater than $S_{max}$). Similarly, the temporary data structure generated by the temporary data structure generating section 441 may only include counts of the number of paths of length S for S≤$S_{max}$, which may result in a node pair having no counts in the temporary data structure. As described below, the estimating section 440 may require a value for the pre-modification shortest path length and/or post-modification shortest path length of such node pair in order to estimate the change in the characteristic of the graph caused by the modification. Therefore, in response to a condition that a node pair connected by a new edge added by a modification has no counts stored in the data structure, the assuming section 442 assumes the length $S_{old}$ of the shortest path between the node pair prior to the modification to be greater than $S_{max}$. For example, the assuming section 442 may assume the length $S_{old}$ to be $S_{max}+1$ or a larger value. Similarly, in response to a condition that a node pair connected by an old edge removed by a modification would have no counts stored in the data structure if the data structure were updated based on the modification, the assuming section 442 assumes the length $S_{new}$ of the shortest path between the node pair after the modification to be greater than $S_{max}$. For example, the assuming section 442 may assume the length $S_{new}$ to be $S_{max}+1$ or a larger value. Note that the hypothetical condition that a node pair would have no counts stored in the data structure if the data structure were updated based on the modification may be evaluated, for example, by referring to a temporary data structure generated by the temporary data structure generating section 441. As described below, the assumed length $S_{old}$ or $S_{new}$ may then be referred to by the estimating section 440 when estimating the change in the characteristic of the graph caused by the modification.

The decrease/increase calculating section 443 calculates a decrease or an increase in the length S of the shortest path between each node pair connected by at least one new edge added by the modification and/or at least one old edge removed by the modification. For example, the decrease/increase calculating section 443 may calculate, based on the data structure and the modification, a decrease in the length S of the shortest path between each node pair connected by a new edge added by the modification. Similarly, the decrease/increase calculating section 443 may calculate, based on the data structure and the modification, an increase in the length S of the shortest path between each node pair connected by an old edge removed by the modification. The decrease/increase calculating section 443 may calculate the decrease or increase based on the data structure and a temporary data structure generated by the temporary data structure generating section 441. For example, for a given node pair, connected by at least one new edge and/or at least one old edge, the decrease/increase calculating section 443 may calculate the decrease or increase by subtracting the length $S_{old}$ of the shortest path between the node pair prior to the modification from the length $S_{new}$ of the shortest path between the node pair after the modification, with the difference indicating a change in the length of the shortest path that is negative in the case of a decrease or positive in the case of an increase (or 0 in the case of no change). The length $S_{old}$ may be read from Index$(S,n_0,n_1)$ or given an assumed value by the assuming section 442. The length $S_{new}$ may be read from the sum of Index$(S,n_0,n_1)$+Temp_Index$(S,n_0,n_1,n_2,n_3)$ or given an assumed value by the assuming section 442.

As described above, for each node pair connected by at least one new edge added by the modification and/or at least one old edge removed by the modification, the decrease/increase calculating section 443 may calculate a change (decrease or increase) in shortest path length. The estimating section 440 sums the changes (decreases and/or increases). For example, if the modification only adds one or more edges and the decrease/increase calculating section 443 only calculates decreases, the estimating section 440 may sum the decreases. Similarly, if the modification only removes one or more edges and the decrease/increase calculating section 443 only calculates increases, the estimating section 440 may sum the increases.

The modification generating section 450 generates a modification of the graph. For example, the modification generating section 450 may generate the modification using at least one of 2-opt, simulated annealing, and a genetic algorithm. In the example shown in FIG. 4, the estimating section 440 obtains, as the modification on which the change in the characteristic of the graph is estimated, the modification generated by the modification generating section 450. However, the modification may instead be provided to the apparatus 400 by a user, in which case the estimating section 440 may obtain the modification by referring directly to the graph storage 415 or the I/O section 410 and the modification generating section 450 may be omitted.

The modification applying section 460 applies or discards the modification obtained by the estimating section 440 based on the change in the characteristic of the graph estimated by the estimating section 440. For example, the modification applying section 460 may apply the modification to the graph stored in the graph storage 415 in response to a condition that the estimated change in the characteristic indicates an improvement in the performance of the system, whereas the modification applying section 460 may discard the modification in response to a condition that the estimated change in the characteristic does not indicate an improvement in the performance of the system. For example, in a case where the estimated change is determined by the estimating section 440 as the sum of changes (decreases and/or increases) in shortest path length over a set of node pairs connected by edges added and/or removed by the modification, a negative sum (corresponding to a net decrease in shortest path length) may indicate an improvement in the performance of the system while a positive or zero sum (corresponding to a net increase or no change in shortest path length) may not indicate an improvement in the performance of the system. In such a case, the modification applying section 460 may apply the modification when the estimated change is negative and otherwise discard the modification. Alternatively, the threshold value of the estimated change for applying the modification may be a predetermined negative value less than zero. Thus, the modification applying section 460 may discard the modification when the estimated change is not negative enough, indicating, e.g. that an improvement in the performance of the system is not significant enough to justify modifying the graph. The modification applying section 460 may also determine whether to discard or apply a modification by comparing the estimated change with those of other modifications. For example, the best modification may be selected among two or more modifications (or among two or more modifications whose estimated change is below a threshold value), and the modification applying section 460 may apply the best modification and discard the other(s).

The data structure updating section 470 may update the data structure stored in the data structure storage 425 to reflect the modification obtained by the estimating section 440 in response to a condition that the estimated change in the characteristic indicates an improvement in the performance of the system. In other words, the data structure updating section 470 may update the data structure in response to the same condition that causes the modification applying section 460 to apply the modification to the graph. In the example shown in FIG. 4, the data structure updating section 470 refers to the output of the estimating section 440. However, the data structure updating section 470 may instead update the data structure by referring directly to the graph storage 415 or the modification applying section 460.

The characteristic of the graph that is indicative of the performance of the system may include an objective function, such as a function of at least one of a diameter of the graph, an average or a total length between nodes in the graph, an average or a total length between nodes in the graph weighted by a weight of each of the nodes, an average or a total length between nodes in the graph weighted by a weight of each of the node pairs, an average or a total length between nodes in the graph weighted by a weight of each edge connecting a node pair, and an average or a total length between nodes in the graph weighted by a weight of each of the paths. The estimated change determined by the estimating section 440 as described above may effectively serve as an estimate of the change in such an objective function due to the modification. By applying or discarding the modification based on the estimated change, it may be possible to optimize the graph to improve performance of the system while avoiding a time-consuming calculation of the objective function itself.

As described above, the characteristic of the graph that is indicative of the performance of the system may include an objective function. The objective function calculating section 480 periodically calculates the objective function. For example, a plurality of modifications may be applied to the graph by the apparatus 400 with at least two modifications being applied to the graph between each calculation of the objective function by the objective function calculating section 480. By periodically calculating the objective function itself, it may be possible to ensure that the optimization of the graph based on the estimated change in the characteristic is working correctly. That is, the apparatus 400 may check the estimated change in the characteristic of the graph against an actually calculated change in the characteristic of the graph (or may check the result of the estimated change against an actually calculated characteristic of the graph) and make adjustments accordingly in order to remain on track. For example, the modification applying section 460 may undo the at least two modifications between a preceding calculation of the objective function and a current calculation of the objective function in response to a condition that the current calculation of the objective function does not indicate an improvement in the performance of the system relative to the preceding calculation of the objective function. For example, the graph storage 415 may store a number of past versions of the graph that is at least as great as a maximum number of modifications that may be applied between calculations of the objective function by the objective function calculating section 480, and the modification applying section 460 may undo modifications by reverting the graph to one of the past versions.

Figure 5:
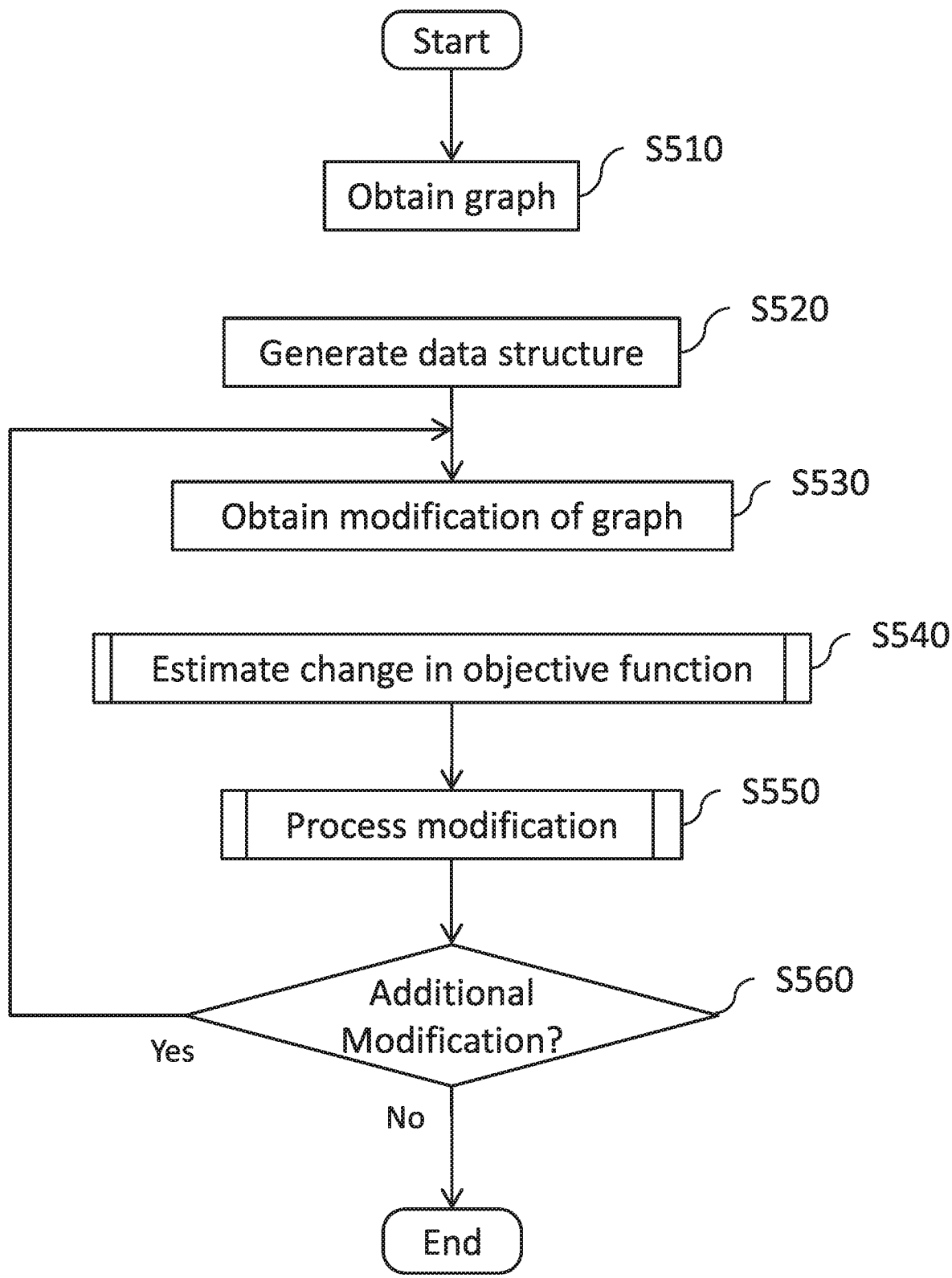
FIG. 5 shows an example operational flow of the apparatus 400 according to an embodiment of the present invention.

FIG. 5 shows an example operational flow of the apparatus 400 according to an embodiment of the present invention. In the example shown in FIG. 5, the apparatus 400 performs the operations from S510 to S560, but the apparatus 400 shown in FIG. 5 is not limited to using this operational flow. Also, the operational flow in FIG. 5 may be performed by a modified apparatus or a different apparatus that differs from the apparatus 400 shown in FIG. 4.

First, the apparatus 400 obtains a graph including a plurality of nodes and a plurality of paths between the nodes, the graph representing an arrangement of elements in a system (S510). For example, the I/O section 410 of the apparatus 400 may obtain a graph from outside the apparatus 400 (e.g. from a user) and store it in the graph storage 415.

Next, the apparatus 400 generates a data structure in which, for each node pair of the plurality of nodes, a count of the number of paths of length S between the node pair is stored in association with the length S (S520). For example, the data structure generating section 420 of the apparatus 400 may generate a data structure $Index(S,n_0,n_1)$ based on the graph stored in the graph storage 415, with a maximum path length $S_{max}$ determined by the $S_{max}$ determining section 430 or provided by a user. The data structure generating section 420 may store the data structure in the data structure storage 425.

Next, the apparatus 400 obtains a modification of the graph (S530). For example, the estimating section 440 of the apparatus 400 may obtain a modification generated by the modification generating section 450 based on the graph stored in the graph storage 415 or provided by a user. The modification may include the addition of at least one new edge and/or the removal of at least one old edge.

Next, the apparatus 400 estimates, based on the data structure and the modification, a change in a characteristic of the graph caused by the modification, the characteristic being indicative of performance of the system (S540). For example, the estimating section 440 of the apparatus 400 may estimate a change in an objective function of the graph stored in the graph storage 415 based on the data structure stored in the data structure storage 425 and the obtained modification.

Next, the apparatus 400 processes the modification (S550). For example, the modification applying section 460 of the apparatus 400 may apply or discard the modification to the graph stored in the graph storage 415 and the data structure updating section 470 may update or not update the data structure stored in the data structure storage 425 accordingly.

Lastly, if there are additional modifications to obtain ("Yes" at S560), the process flow returns to step S530, where a new modification is obtained by the apparatus 400. After the last modification has been processed at step S550, there will be no additional modifications to obtain ("No" at S560) and the process ends. In this way, the apparatus 400 may repeat, for a plurality of modifications, the obtaining of a modification of the graph, the estimating of a change in a characteristic of the graph, the applying of the modification and updating the data structure in response to a condition that the estimated change indicates an improvement in the performance of the system, and the discarding of the modification in response to a condition that the estimated change does not indicate an improvement in the performance of the system.

Figure 6:
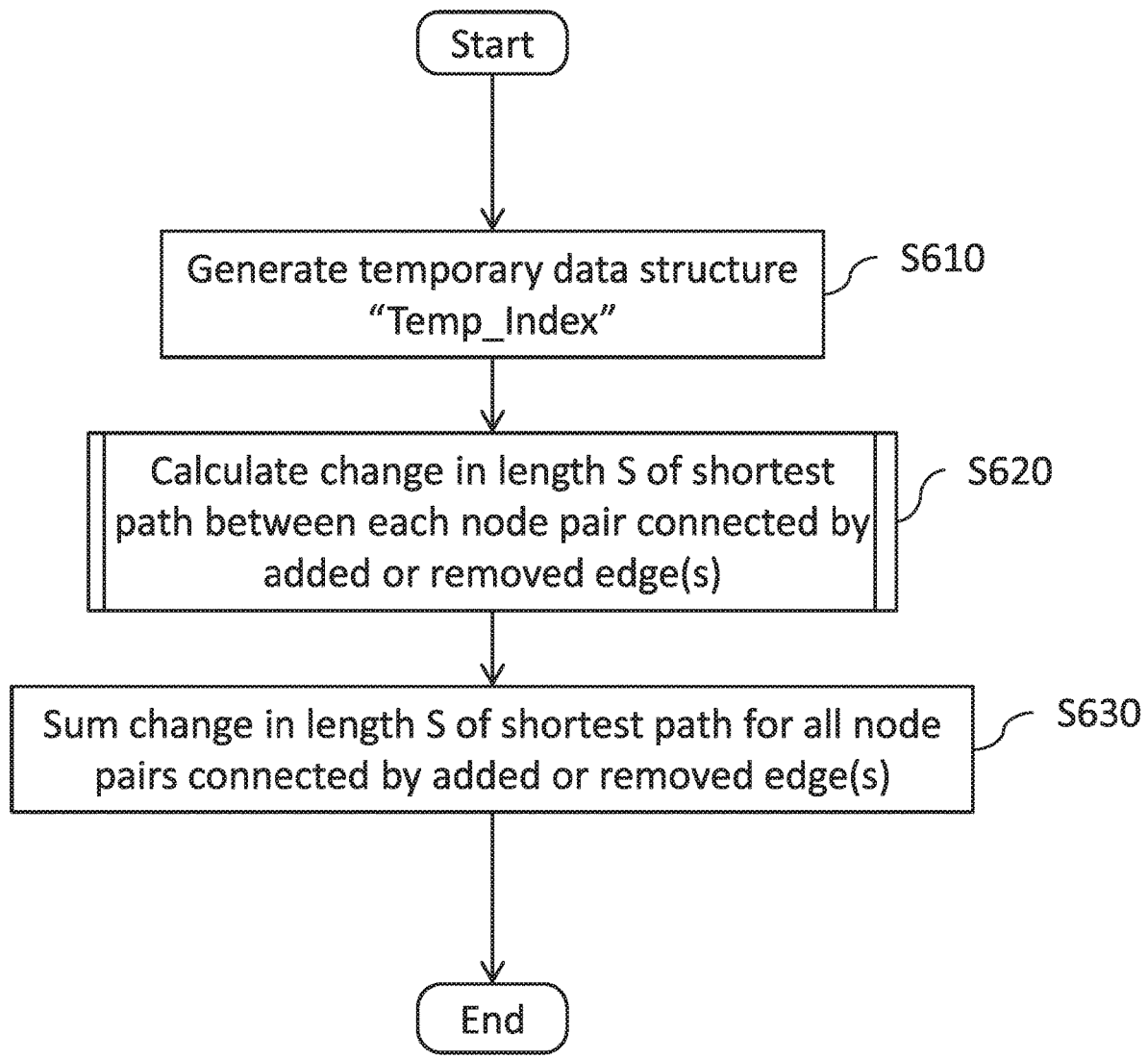
FIG. 6 shows an example operational flow of step S540 in FIG. 5.

FIG. 6 shows an example operational flow of step S540 in FIG. 5. After a modification has been obtained by the apparatus 400 at step S530, the apparatus 400 generates a temporary data structure in which, for each node pair connected by a new edge added by the modification, a count of the number of paths of length S between the node pair and through the new edge is stored as a positive value in association with the length S or added to an existing value associated with the length S and, for each node pair connected by an old edge removed by the modification, a count of the number of paths of length S between the node pair and through the old edge is stored as a negative value in association with the length S or subtracted from an existing value associated with the length S (S610). For example, the temporary data structure generating section 441 of the estimating section 440 of the apparatus 400 may generate a temporary data structure $Temp\_Index(S,n_0,n_1,n_2,n_3)$ as described above.

Next, the apparatus 400 calculates, based on the data structure and the temporary data structure, a change in the length S of the shortest path between each node pair connected by at least one new edge added by the modification and/or at least one old edge removed by the modification (S620). For example, the decrease/increase calculating section 443 of the estimating section 440 of the apparatus 400 may calculate the change based on the data structure $Index(S,n_0,n_1)$ stored in the data structure storage 425 and the temporary data structure $Temp\_Index(S,n_0,n_1,n_2,n_3)$ generated by the temporary data structure generating section 441.

Lastly, the apparatus 400 sums the calculated change in length S of the shortest path for all node pairs connected by added or removed edge(s) (S630). For example, the estimating section 440 of the apparatus 400 may sum the changes (decreases and/or increases) calculated by the decrease/increase calculating section 443. The estimating section 440 may output the resulting sum as the estimated change in the objective function. The estimating section 440 may further estimate an absolute change in the objective function by dividing this estimated change by the total number of node pairs, e.g. $(½)*N*(N-1)$ where N is the number of nodes.

Figure 7:
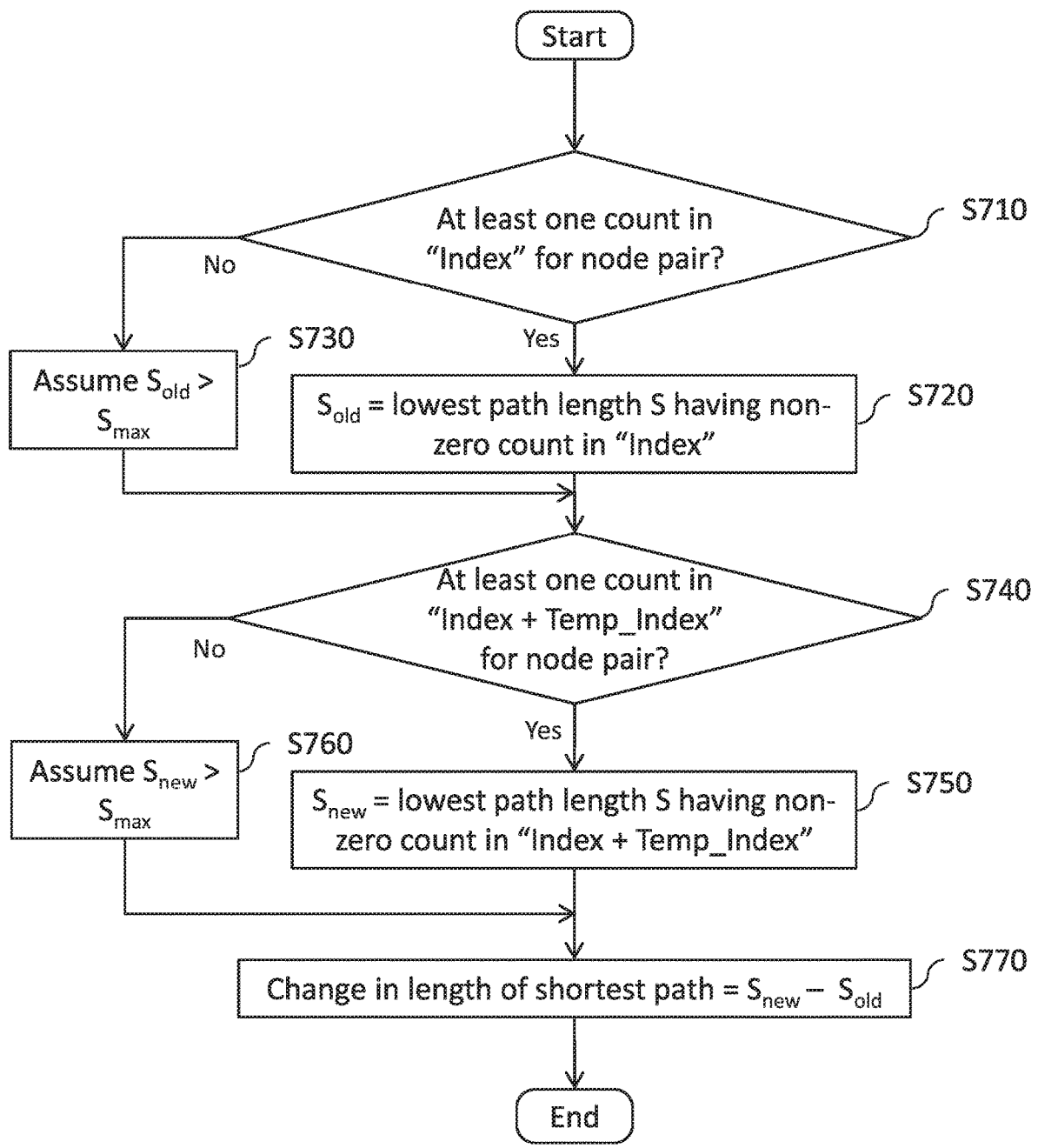
FIG. 7 shows an example operational flow of step S620 in FIG. 6.

FIG. 7 shows an example operational flow of step S620 in FIG. 6. As indicated in FIG. 6, the operational flow of FIG. 7 proceeds for each node pair connected by at least one or more added and/or removed edges. That is, FIG. 7 illustrates the process for a single node pair, but the process may repeat or proceed simultaneously for many node pairs, i.e. all node pairs affected by the modification.

First, with the data structure $Index(S,n_0,n_1)$ stored in the data structure storage 425 and a temporary data structure $Temp\_Index(S,n_0,n_1,n_2,n_3)$ having been generated by the apparatus 400 at step S610, the decrease/increase calculating section 443 of the apparatus 400 determines whether at least one count exists in the data structure $Index(S,n_0,n_1)$ for a given node pair under consideration. If at least one count exists ("Yes" at S710), the decrease/increase calculating section 443 sets $S_{old}$ equal to the lowest path length S having a non-zero count for the node pair in the data structure $Index(S,n_0,n_1)$ (S720). For example, if $S_{max}=3$, the values of $Index(S,n_0,n_1)$ for a given node pair $(n_0,n_1)=(A,B)$ may be $Index(1,A,B)=0$, $Index(2,A,B)=1$, and $Index(3,A,B)=2$ as illustrated in the example of FIGS. 1-3 (pre-modification). In this case, the lowest path length S having a non-zero count for the node pair $(n_0,n_1)=(A,B)$ is 2. Therefore, the decrease/increase calculating section 430 would set $S_{old}$ equal to 2.

On the other hand, if no count exists in $Index(S,n_0,n_1)$ for the node pair under consideration ("No" at S710), the decrease/increase calculating section 430 sets $S_{old}$ equal to an assumed value greater than $S_{max}$ (S730). For example, with $S_{max}=3$, if $Index(1,A,B)=0$, $Index(2,A,B)=0$, and $Index(3,A,B)=0$, no count exists. In this situation, the decrease/increase calculating section 443 may refer to the assuming section 442, which may provide an appropriate assumed value greater than $S_{max}$. For example, the assuming section 442 may assume the shortest path length for the node pair to be $S_{max}+1=4$ (or some larger number, and the decrease/increase calculating section 443 may set $S_{old}=4$ (or the larger number).

Next, the decrease/increase calculating section 443 of the apparatus 400 adds the positive and/or negative counts of the temporary data structure $Temp\_Index(S,n_0,n_1,n_2,n_3)$ for the node pair under consideration to the counts of the data structure $Index(S,n_0,n_1)$ for the node pair under consideration and determines whether at least one count exists for the node pair in the combined $Index(S,n_0,n_1)+Temp\_Index(S,n_0,n_1,n_2,n_3)$. That is, the decrease/increase calculating section 443 of the apparatus 400 determines whether at least one count would exist for the node pair in an updated $Index(S,n_0,n_1)$ if the modification represented by $Temp\_Index(S,n_0,n_1,n_2,n_3)$ were applied to the graph represented by $Index(S,n_0,n_1)$. If at least one count exists in the combined $Index(S,n_0,n_1)+Temp\_Index(S,n_0,n_1,n_2,n_3)$ for the node pair ("Yes" at S740), the decrease/increase calculating section 443 sets $S_{old}$ equal to the lowest path length S having a non-zero count for the node pair in the combined data structure $Index(S,n_0,n_1)+Temp\_Index(S,n_0,n_1,n_2,n_3)$ (S750). For example, if $S_{max}=3$, the values of $Index(S,n_0,n_1)$ for a given node pair $(n_0,n_1)=(A,B)$ may be $Index(1,A,B)=0$, $Index(2,A,B)=1$, and $Index(3,A,B)=2$ as illustrated in the example of FIGS. 1-3 (pre-modification). A temporary data structure $Temp\_Index(S,n_0,n_1,n_2,n_3)$ representing the modification shown in FIG. 2 may, for example, have the values $Temp\_Index(1,A,B,X,Y)=0$, $Temp\_Index(1,A,B,X,Y)=-1$, and $Temp\_Index(1,A,B,X,Y)=0$ for the node pair $(n_0,n_1)=(A,B)$. That is, through the edge removed by the modification, there are no 1-length paths from A to B, there is one 2-length path from A to B, and there are no 3-length paths from A to B. (There is a 4-length path, but it is not counted in this example because $S_{max}=3$.) Since the edge is removed, rather than added, by the modification, the value $Temp\_Index(1,A,B,X,Y)=-1$ is negative. In this case, the lowest path length S having a non-zero count for the node pair $(n_0,n_1)=(A,B)$ in the combined data structure $Index(S,n_0,n_1)+Temp\_Index(S,n_0,n_1,n_2,n_3)$ is 3 (since the value of $Index(2,n_0,n_1)+Temp\_Index(2,n_0,n_1,n_2,n_3)$ becomes zero). Therefore, the decrease/increase calculating section 430 would set $S_{new}$ equal to 3.

On the other hand, if no count exists in the combined data structure $Index(S,n_0,n_1)+Temp\_Index(S,n_0,n_1,n_2,n_3)$ for the node pair under consideration ("No" at S740), the decrease/increase calculating section 430 sets $S_{new}$ equal to an assumed value greater than $S_{max}$ (S760). For example, with $S_{max}=3$, if $Index(1,n_0,n_1)+Temp\_Index(1,n_0,n_1,n_2,n_3)=0$, $Index(2,n_0,n_1)+Temp\_Index(2,n_0,n_1,n_2,n_3)=0$, and $Index(3,n_0,n_1)+Temp\_Index(3,n_0,n_1,n_2,n_3)=0$, no count exists. In this situation, the decrease/increase calculating section 443 may refer to the assuming section 442, which may provide an appropriate assumed value greater than $S_{max}$. For example, the assuming section 442 may assume the shortest path length for the node pair to be $S_{max}+1=4$ (or some larger number), and the decrease/increase calculating section 443 may set $S_{new}=4$ (or the larger number).

Lastly, with values having been assigned to $S_{old}$ and $S_{new}$ as described above, the decrease/increase calculating section 443 calculates the change in length of the shortest path between A and B as the shortest path length after the modification $S_{new}$ minus the shortest path length prior to the modification $S_{old}$ (S770). The calculated change may be a decrease (if $S_{new}-S_{old}$ is a negative value) or an increase (if $S_{old}-S_{new}$ is a positive value). The calculated change may be zero (if $S_{new}-S_{old}=0$). The calculated change may be zero in the case where both $S_{new}$ and $S_{old}$ are assumed to be a number greater than $S_{max}$.

In the example shown in FIG. 7, a value is determined for $S_{old}$ before a value is determined for $S_{new}$. However, the order of the steps in FIG. 7 is not important and the values for $S_{old}$ and $S_{new}$ may be determined in reverse order or simultaneously.

Figure 8:
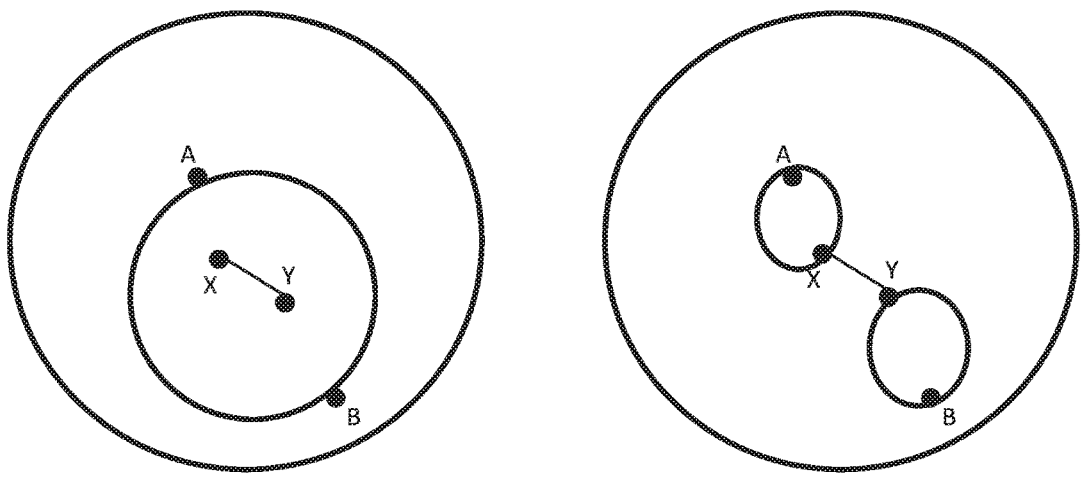
FIG. 8 shows an example graph undergoing the addition of an edge, along with a corresponding update of a data structure Index($S,n_0,n_1$) by means of a temporary data structure Temp_Index($S,n_0,n_1,n_2,n_3$).

FIG. 8 shows an example graph undergoing the addition of an edge, along with a corresponding update of a data structure $Index(S,n_0,n_1)$ by means of a temporary data structure $Temp\_Index(S,n_0,n_1,n_2,n_3)$. In the upper-left portion of FIG. 8, the graph is shown with a region containing all paths between nodes A and B, in which an edge is added between nodes X and Y. Below the graph, hypothetical counts of the paths between nodes A and B prior to the addition of the edge are shown as values of $Index(S,A,B)$ to the left of the arrows "→", i.e. 0, 2, 10, 20, . . . , 50. In the upper-right portion of FIG. 8, the same graph is shown, this time with two regions containing all paths between nodes A and X and all paths between nodes Y and B, respectively. In principle, if we lift the restriction that a path is defined such that each node on the path can be visited once at most, the number of paths of a given length S between nodes A and B that are connected by the added edge in the direction from X to Y can be determined by summing, for each partial path length r=1, 2, 3, . . . S−2, the product of the number of partial paths between nodes A and X of length r and the number of partial paths between nodes Y and B of length S−(r+1). Similarly, the number of paths of a given length S between nodes A and B that are connected by the added edge in the direction from Y to X can be determined by summing, for each partial path length r=1, 2, 3, . . . S−2, the product of the number of partial paths between nodes A and Y of length r and the number of partial paths between nodes X and B of length S−(r+1). The total number of paths of a given length S between nodes A and B that are connected by the added edge can then be determined by adding the number of paths of the length S between nodes A and B connected by the added edge in the direction from X to Y and the number of paths of length S between nodes A and B connected by the added edge in the direction from Y to X. If, on the other hand, a path is defined such that each node on the path can be visited once at most, those paths that violate this definition (i.e. loop paths) may be subtracted from the result or otherwise avoided in the calculation. For example, it is possible to generate all non-loop paths A-X (between nodes A and X) and all non-loop paths Y-B (between nodes Y and B), and then count all combinations of paths A-X and paths Y-B excluding combinations that makes loop paths between nodes A and B. It is also possible to change the order of this calculation by generating all non-loop paths connecting to X from any nodes and all non-loop paths connecting from Y to any nodes, and then count all combinations of those paths to generate the entire temporary data structure. Alternatively, such loop paths may be allowed in order to simplify the algorithm for finding paths, which may reduce calculation time but result in a larger number of paths. For simplicity, the regions in the upper-right portion of FIG. 8 illustrate only the set of partial paths between A and X and the set of partial paths between Y and B, i.e. only those partial paths contributing to paths connected by the added edge in the direction from X to Y. (One might illustrate the set of partial paths between A and Y and the set of partial paths between X and B using overlapping regions.)

The above calculation assumes that neither node X nor node Y is the same node as node A or node B. More generally, if one considers the possibility of a single 0-length partial path between node A and node X (i.e. if node A is node X) and/or a single 0-length partial path between node Y and node B (i.e. if node Y is node B), the number of paths of a given length S between nodes A and B that are connected by the added edge in the direction from X to Y can be determined by summing, for each partial path length r=0, 1, 2, 3, . . . S−1, the product of the number of partial paths between nodes A and X of length r and the number of partial paths between nodes Y and B of length S−(r+1). Similarly, the number of paths of a given length S between nodes A and B that are connected by the added edge in the direction from Y to X can be determined by summing, for each partial path length r=0, 1, 2, 3, . . . S−1, the product of the number of partial paths between nodes A and Y of length r and the number of partial paths between nodes X and B of length S−(r+1).

Below the graph (in the lower-right portion of FIG. 8), hypothetical counts of the number of paths between nodes A and B that are connected by the added edge are shown as values of $Temp\_Index(S,A,B,X,Y)$, i.e. 0, 0, 1, 4, . . . 8. The counts of the combined data structure $Index(S,A,B)+Temp\_Index(S,A,B,X,Y)$ are shown in the lower-left portion of FIG. 8, to the right of the arrows "→". That is, the added edge between nodes X and Y have no effect on the counts for S=1 and S=2 but increase the number of paths of length 3, 4, . . . $S_{max}$ to 11, 24, . . . 58, respectively. In a case where the added edge between nodes X and Y is the entirety of a modification, it can be seen that the shortest path length prior to the modification $S_{old}$ and the shortest path length after the modification $S_{new}$ are both equal to 2 in this example, resulting in an estimated change in the length of the shortest path of 0, i.e. no change.

Figure 9:
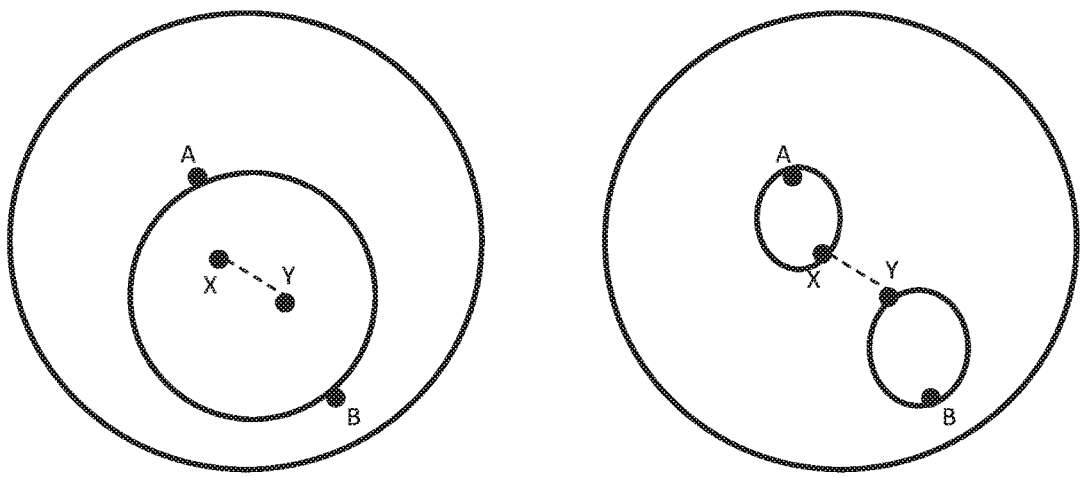
FIG. 9 shows an example graph undergoing the removal of an edge, along with a corresponding update of a data structure Index($S,n_0,n_1$) by means of a temporary data structure Temp_Index($S,n_0,n_1,n_2,n_3$).

FIG. 9 shows an example graph undergoing the removal of an edge, along with a corresponding update of a data structure $Index(S,n_0,n_1)$ by means of a temporary data structure $Temp\_Index(S,n_0,n_1,n_2,n_3)$. FIG. 9 is identical to FIG. 8 in all respects except that an edge connecting X and Y is removed rather than added. Thus, as can be seen, negative values are given to the counts of $Temp\_Index(S,A,B,X,Y)$, and the resulting combined data structure $Index(S,A,B)+Temp\_Index(S,A,B,X,Y)$ has reduced counts for S=3, 4, . . . $S_{max}$, accordingly. Again, it can be seen that the shortest path length prior to the modification $S_{old}$ and the shortest path length after the modification $S_{new}$ are both equal to 2, resulting in an estimated change in the length of the shortest path of 0, i.e. no change.

Figure 10:
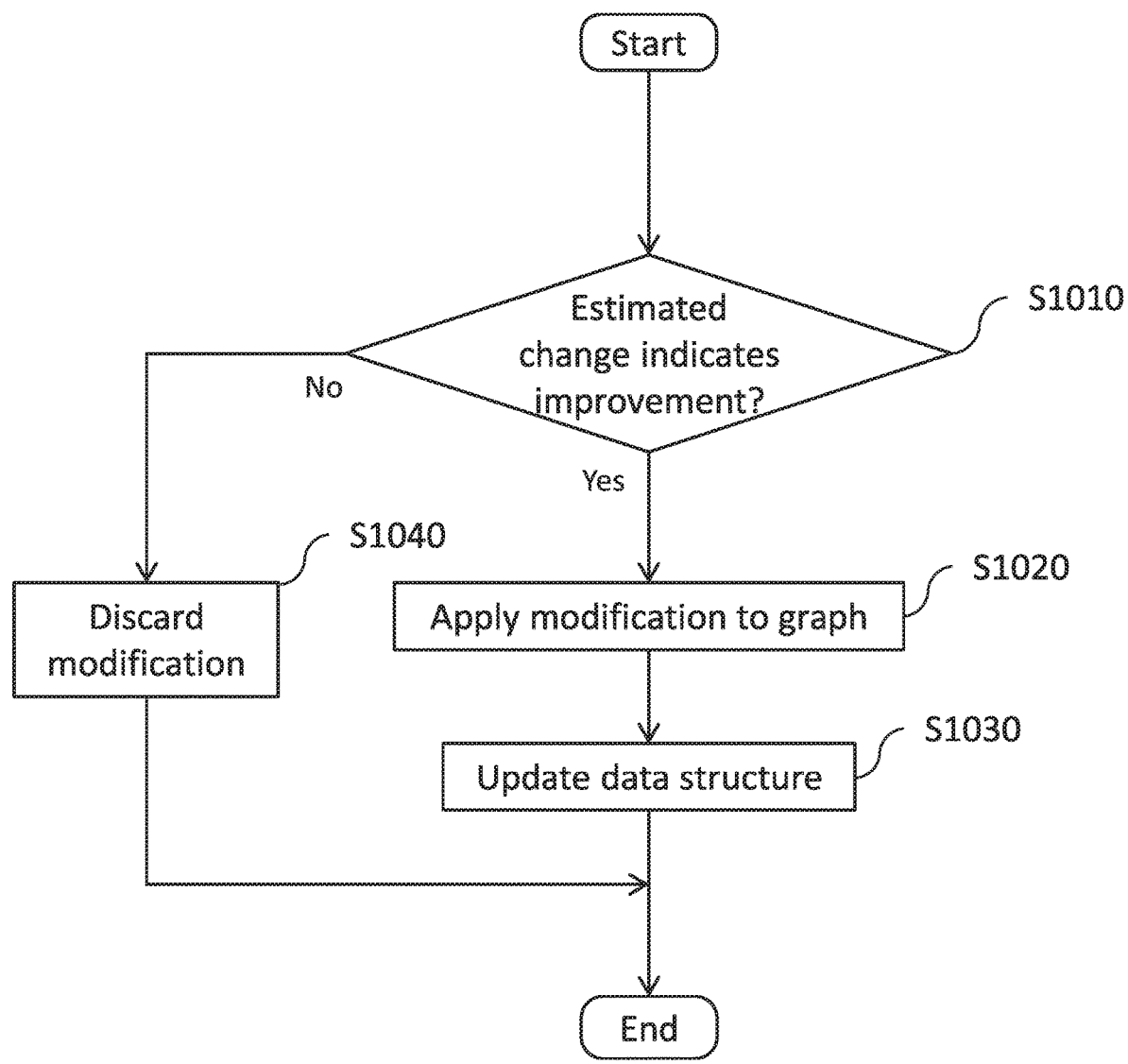
FIG. 10 shows an example operational flow of step S550 in FIG. 5.

FIG. 10 shows an example operational flow of step S550 in FIG. 5. With the estimated change in the characteristic of the graph caused by the modification having been determined in step S540, if the estimated change indicates an improvement in the performance of the system ("Yes" at S1010), the apparatus 400 applies the modification to the graph (S1020) and updates the data structure (S1030). For example, the modification applying section 460 of the apparatus 400 may apply the modification to the graph stored in the graph storage 415 in response to a condition that the sum of the changes in shortest path length estimated by the estimating section 440 (i.e. summed over all node pairs affected by the modification) is negative. The data structure updating section 470 may update the data structure stored in the data structure storage 425 to reflect the applied modification. On the other hand, if the estimated change does not indicate an improvement in the performance of the system ("No" at S1010), the apparatus 300 discards the modification (S1040). For example, the modification applying section 460 may discard the modification by creating or deleting a record of the modification or estimated change or simply by not applying the modification.

Figure 11:
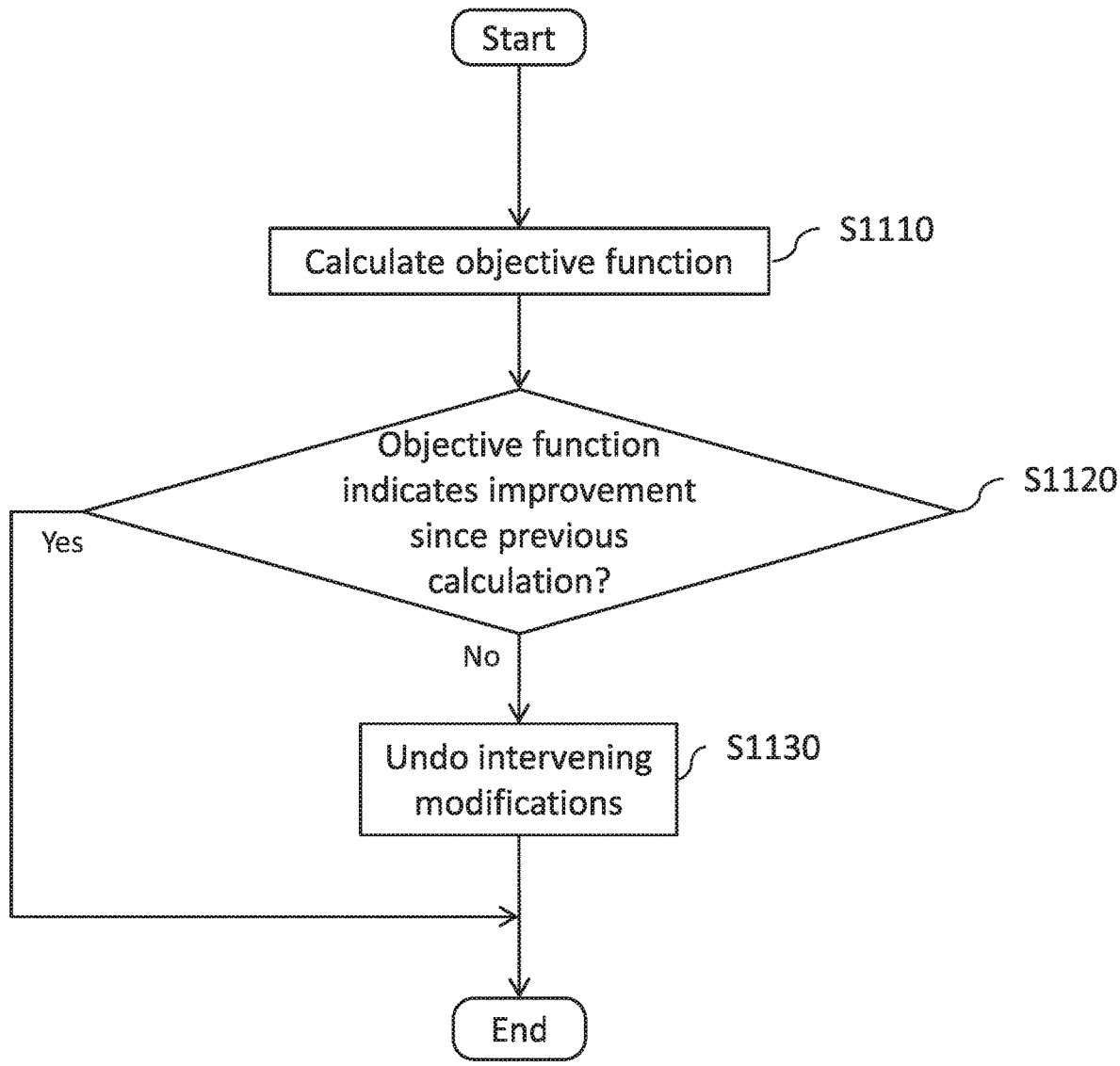
FIG. 11 shows an example operational flow of the apparatus 400 that may occur at any time during the operational flow of FIG. 5.

FIG. 11 shows an example operational flow of the apparatus 400 that may occur at any time during the operational flow of FIG. 5. For example, the operational flow shown in FIG. 11 may occur periodically with at least two modifications being applied to the graph between each occurrence. The timing of the beginning of the operational flow shown in FIG. 11 may be, for example, just before a new modification is obtained in step S530 after several iterations of steps S530 through step S560, but other timings are possible. As explained above, the characteristic of the graph whose change is estimated by the apparatus 400 may include an objective function of the graph. By periodically proceeding through the operational flow of FIG. 11, the apparatus 400 can check the accuracy of the estimation.

First, the apparatus 400 calculates the objective function (S1110). The objective function may be, for example, the average shortest path length. For example, the objective function calculating section 480 may calculate the average shortest path length directly by conventional methods, using the entire graph data of the graph stored in the graph storage 415. If the calculated objective function indicates an improvement (e.g. reduced average shortest path length) since the previous calculation of the objective function ("Yes" at S1120), then it can be understood that the apparatus 400 is correctly optimizing the graph and the periodic check of FIG. 11 ends. If, on the other hand, the calculated objective function does not indicate an improvement since the previous calculation of the objective function ("No" at S1120), the apparatus 400 may undo intervening modifications (S1130). For example, the modification applying section 460 of the apparatus 400 may, based on the calculated objective function, undo all modifications to the graph stored in the graph storage 415 between the previous calculation of the objective function and the present calculation of the objective function (and the data structure updating section 470 may update the data structure stored in the data structure storage 425 accordingly). In this way, the apparatus 400 may be prevented from incorrectly optimizing the graph in a way that does not improve the performance of the system.

Unlike the computation cost of calculating an objective function outright, the computation cost of estimating the change in the objective function as described above with respect to the apparatus 400 is mostly independent of the size of the graph. Thus, by only periodically calculating the objective function as described with respect to FIG. 11 (or by never calculating the objective function), the computation cost of optimizing the graph can be reduced, especially for large graphs.

In addition to the example operational flow shown in FIG. 11, other periodic checks may be made during the looping processes S530-S560 in the operational flow of FIG. 5. For example, as the graph stored in the graph storage 415 is modified to remove paths, it may turn out that there exist node pairs that are no longer connected by any paths, such that the graph may effectively have been split into two graphs. Thus, the apparatus 400 may periodically check whether the graph stored in the graph storage 415 includes at least one path between each node pair. Such a check may be made periodically, for example, such that at least two modifications are applied to the graph between each check. If the check indicates that the graph has been split into two graphs, the apparatus 400 may, for example, operate on the graphs separately going forward or discard one of the graphs.

As can be understood from this disclosure, the features of the apparatus 400 can make it possible to optimize a graph while avoiding a time-consuming calculation of an objective function of the graph or improving the efficiency of such calculation. In this way, the apparatus 400 can support the efficient optimization of the graph and the underlying system.

Figure 12:
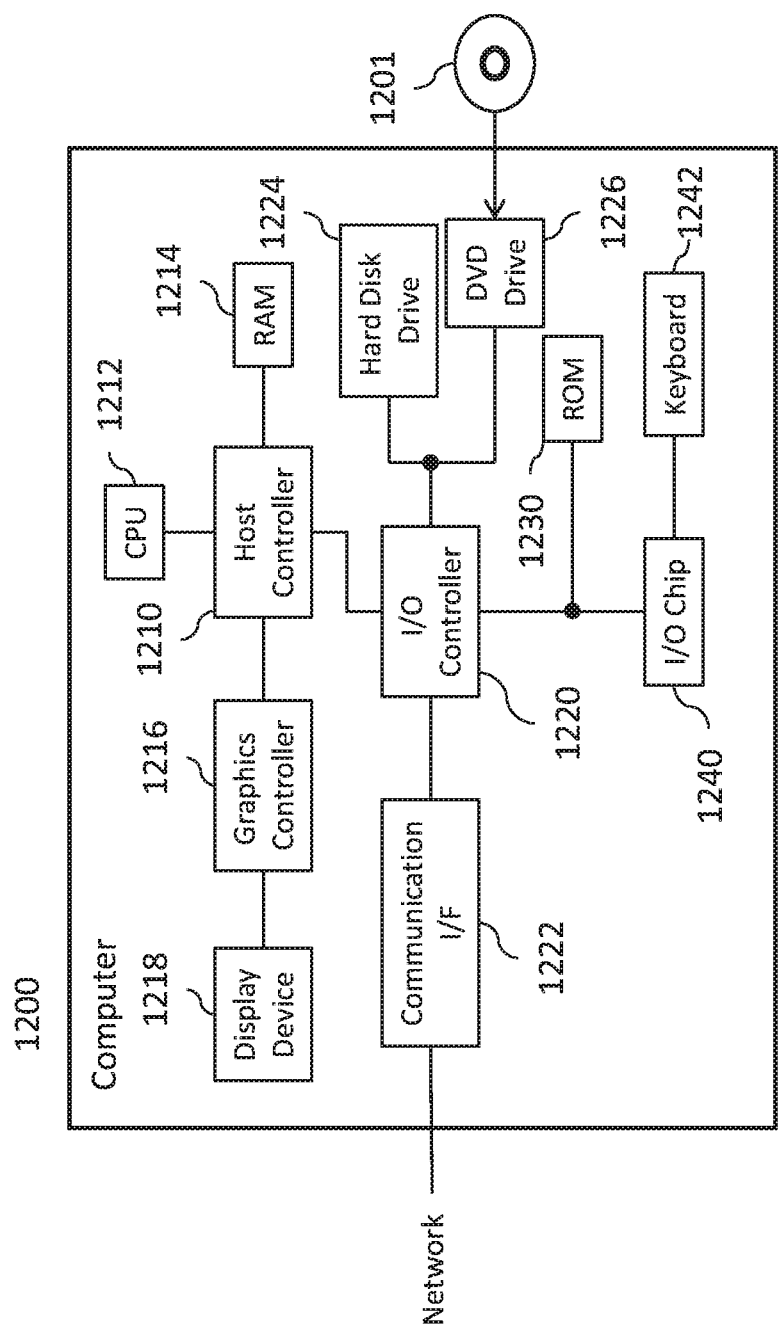
FIG. 12 shows an example of a computer 1200 in which the apparatus 400, the operational flows of FIGS. 5, 11, and/or other embodiments of the claimed invention may be wholly or partly embodied.

FIG. 12 shows an example of a computer 1200 in which the apparatus 400, the operational flows of FIGS. 5 and 11, and/or other embodiments of the claimed invention may be wholly or partly embodied. The computer 1200 according to the present embodiment includes a CPU 1212, a RAM 1214, a graphics controller 1216, and a display device 1218, which are mutually connected by a host controller 1210. The computer 1200 also includes input/output units such as a communication interface 1222, a hard disk drive 1224, and a DVD-ROM drive 1226, which are connected to the host controller 1210 via an input/output controller 1220. The computer also includes legacy input/output units such as a ROM 1230 and a keyboard 1242, which is connected to the input/output controller 1220 through an input/output chip 1240.

The host controller 1210 connects the RAM 1214 with the CPU 1212 and the graphics controller 1216, which access the RAM 1214 at a high transfer rate. The CPU 1212 operates according to programs stored in the ROM 1230 and the RAM 1214, thereby controlling each unit. The graphics controller 1216 obtains image data generated by the CPU 1212 on a frame buffer or the like provided in the RAM 1214, and causes the image data to be displayed on the display device 1218. Alternatively, the graphics controller 1216 may contain therein a frame buffer or the like for storing image data generated by the CPU 1212.

The input/output controller 1220 connects the host controller 1210 with the communication interface 1222, the hard disk drive 1224, and the DVD-ROM drive 1226, which are relatively high-speed input/output units. The communication interface 1222 communicates with other electronic devices via a network. The hard disk drive 1224 stores programs and data used by the CPU 1212 within the computer 1200. The DVD-ROM drive 1226 reads the programs or the data from the DVD-ROM 1201, and provides the hard disk drive 1224 with the programs or the data via the RAM 1214.

The ROM 1230 and the keyboard 1242 and the input/output chip 1240, which are relatively low-speed input/output units, are connected to the input/output controller 1220. The ROM 1230 stores therein a boot program or the like executed by the computer 1200 at the time of activation, a program depending on the hardware of the computer 1200. The keyboard 1242 inputs text data or commands from a user, and may provide the hard disk drive 1224 with the text data or the commands via the RAM 1214. The input/output chip 1240 connects the keyboard 1242 to the input/output controller 1220, and may connect various input/output units via a parallel port, a serial port, a keyboard port, a mouse port, and the like to the input/output controller 1220.

A program to be stored on the hard disk drive 1224 via the RAM 1214 is provided by a recording medium such as the DVD-ROM 1201 or an IC card. The program is read from the recording medium, installed into the hard disk drive 1224 within the computer 1200 via the RAM 1214, and executed in the CPU 1212.

A program that is installed in the computer 1200 can cause the computer 1200 to function as an apparatus such as the apparatus 400 of FIG. 4. Such a program may act on the CPU 1212 to cause the computer 1200 to function as some or all of the sections, components, elements, databases, etc. of the apparatus 400 of FIG. 1 (e.g., the data structure generating section 420, the estimating section 440, etc.).

A program that is installed in the computer 1200 can also cause the computer 1200 to perform an operational flow such as the operational flow of FIG. 5 or 11. Such a program may act on the CPU 1212 to cause the computer 1200 to perform some or all of the steps of FIG. 5 or 11 (e.g., generate data structure S520, estimate change in objective function S540, etc.).

The information processing described in these programs is read into the computer 1200, resulting in the cooperation between a program and the above-mentioned various types of hardware resources. An apparatus or method may be constituted by realizing the operation or processing of information in accordance with the usage of the computer 1200.

For example, when communication is performed between the computer 1200 and an external device, the CPU 1212 may execute a communication program loaded onto the RAM 1214 to instruct communication processing to the communication interface 1222, based on the processing described in the communication program.

The communication interface 1222, under control of the CPU 1212, reads transmission data stored on a transmission buffering region provided in a recording medium such as the RAM 1214, the hard disk drive 1224, or the DVD-ROM 1201, and transmits the read transmission data to a network or writes reception data received from a network to a reception buffering region or the like provided on the recording medium. In this way, the communication interface 1222 may exchange transmission/reception data with a recording medium by a DMA (direct memory access) method or by a configuration in which the CPU 1212 reads the data from the recording medium or the communication interface 1222 of a transfer destination and writes the data into the communication interface 1222 or the recording medium of the transfer destination, so as to transfer the transmission/reception data.

In addition, the CPU 1212 may cause all or a necessary portion of a file or a database to be read into the RAM 1214 such as by DMA transfer, the file or the database having been stored in an external recording medium such as the hard disk drive 1224, the DVD-ROM drive 1226 (DVD-ROM 1201) and perform various types of processing on the data on the RAM 1214. The CPU 1212 may then write back the processed data to the external recording medium by means of a DMA transfer method or the like. In such processing, the RAM 1214 can be considered to temporarily store the contents of the external recording medium, and so the RAM 1214, the external recording apparatus, and the like are collectively referred to as a memory, a storage section, a recording medium, a computer readable medium, etc.

Various types of information, such as various types of programs, data, tables, and databases, may be stored in the recording apparatus to undergo information processing. Note that the CPU 1212 may also use a part of the RAM 1214 to perform reading/writing thereto on a cache memory. In such an embodiment, the cache is considered to be contained in the RAM 1214, the memory, and/or the recording medium unless noted otherwise, since the cache memory performs part of the function of the RAM 1214.

The CPU 1212 may perform various types of processing on the data read from the RAM 1214, which includes various types of operations, processing of information, condition judging, search/replace of information, etc., as described throughout this disclosure and designated by an instruction sequence of programs, and writes the result back to the RAM 1214. For example, when performing condition judging, the CPU 1212 may judge whether each type of variable is larger, smaller, no smaller than, no greater than, or equal to the other variable or constant, and when the condition judging results in the affirmative (or in the negative), the process branches to a different instruction sequence or calls a subroutine.

In addition, the CPU 1212 may search for information in a file, a database, etc., in the recording medium. For example, when a plurality of entries, each having an attribute value of a first attribute is associated with an attribute value of a second attribute, are stored in a recording apparatus, the CPU 1212 may search for an entry matching the condition whose attribute value of the first attribute is designated, from among the plurality of entries stored in the recording medium, and reads the attribute value of the second attribute stored in the entry, thereby obtaining the attribute value of the second attribute associated with the first attribute satisfying the predetermined condition.

The above-explained program or module may be stored in an external recording medium. Exemplary recording mediums include a DVD-ROM 1201, as well as an optical recording medium such as a Blu-ray Disk or a CD, a magneto-optic recording medium such as a MO, a tape medium, and a semiconductor memory such as an IC card. In addition, a recording medium such as a hard disk or a RAM provided in a server system connected to a dedicated communication network or the Internet can be used as a recording medium, thereby providing the program to the computer 1800 via the network.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing.

A non-exhaustive list of more specific examples of the computer readable storage medium includes the following:

a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server.

In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s).

In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the embodiment(s) of the present invention has (have) been described, the technical scope of the invention is not limited to the above described embodiment(s). It is apparent to persons skilled in the art that various alterations and improvements can be added to the above-described embodiment(s). It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

What is claimed is:

1. A method comprising:
obtaining a graph including a plurality of nodes and a plurality of paths between the nodes, the graph representing a system comprising an arrangement of elements;
generating, using a processor, a data structure in which, for each node pair of the plurality of nodes, a count of the number of paths of length S between the node pair is stored in association with the length S;
modifying the graph, using the processor, to obtain a modification of the graph related to the count of the number of paths of length S; and
estimating, based on the data structure and the modification, a change in a characteristic of the graph caused by the modification, the characteristic including an objective function that is quantitatively representative of the connections between the nodes and being indicative of performance of the system.

2. The method of claim 1, wherein
the objective function is a function of at least one of a diameter of the graph, an average or a total length between nodes in the graph, an average or a total length between nodes in the graph weighted by a weight of each of the nodes, an average or a total length between nodes in the graph weighted by a weight of each of the node pairs, an average or a total length between nodes in the graph weighted by a weight of each edge connecting a node pair, and an average or a total length between nodes in the graph weighted by a weight of each of the paths.

3. The method of claim 1, wherein the estimating includes calculating, based on the data structure and the modification, a decrease in the length S of the shortest path between each node pair connected by a new edge added by the modification.

4. The method of claim 3, wherein
the data structure only includes counts of the number of paths of length S for S≤a predetermined upper limit $S_{max}$, and
the method includes, in response to a condition that a node pair connected by the new edge has no counts stored in the data structure, assuming a length $S_{old}$ of the shortest path between the node pair prior to the modification to be greater than $S_{max}$.

5. The method of claim 3, wherein the estimating further includes summing up a total decrease amount from each decrease.

6. The method of claim 1, wherein the estimating includes calculating, based on the data structure and the modification, an increase in the length S of the shortest path between each node pair connected by an old edge removed by the modification.

7. The method of claim 6, wherein
the data structure only includes counts of the number of paths of length S for S≤a predetermined upper limit $S_{max}$, and
the method includes, in response to a condition that a node pair connected by the old edge would have no counts stored in the data structure if the data structure were updated based on the modification, assuming the length $S_{new}$ of the shortest path between the node pair after the modification to be greater than the predetermined upper limit.

8. The method of claim 6, wherein the estimating further includes summing up a total increase amount from each increase.

9. The method of claim 1, wherein the estimating includes:
generating a temporary data structure in which, for each node pair connected by a new edge added by the modification, a count of the number of paths of length S between the node pair and through the new edge is stored as a positive value in association with the length S or added to an existing value associated with the length S and, for each node pair connected by an old edge removed by the modification, a count of the number of paths of length S between the node pair and through the old edge is stored as a negative value in association with the length S or subtracted from an existing value associated with the length S; and
calculating, based on the data structure and the temporary data structure, a decrease or an increase in the length S of the shortest path between each node pair connected by at least one new edge added by the modification and/or at least one old edge removed by the modification.

10. The method of claim 1, further comprising:
applying the modification to the graph and updating the data structure to reflect the modification in response to a condition that the estimated change in the characteristic indicates an improvement in the performance of the system; and
discarding the modification in response to a condition that the estimated change in the characteristic does not indicate an improvement in the performance of the system.

11. The method of claim 10, further comprising:
repeating the modifying the graph, the estimating, the applying, and the discarding for additional modifications of the graph.

12. The method of claim 11, wherein
the characteristic includes an objective function, and
the method further comprises periodically calculating the objective function such that at least two modifications are applied to the graph between each calculation of the objective function.

13. The method of claim 12, further comprising:
undoing the at least two modifications between a preceding calculation of the objective function and a current calculation of the objective function in response to a condition that the current calculation of the objective function does not indicate an improvement in the performance of the system relative to the preceding calculation of the objective function.

14. The method of claim 10, further comprising:
periodically checking whether the graph includes at least one path between each node pair such that at least two modifications are applied to the graph between each check.

15. The method of claim 1, wherein the data structure only includes counts of the number of paths of length S for S≤a predetermined upper limit $S_{max}$ where $S_{max}$ is less than a diameter of the graph.

16. The method of claim 1, wherein
the data structure only includes counts of the number of paths of length S for S≤a predetermined upper limit $S_{max}$, and
the method further comprises determining $S_{max}$ based on a diameter of the graph.

17. The method of claim 1, wherein the count of the number of paths of length S between a node pair is represented in the data structure by fewer bits than are required for representing a maximum value of the count.

18. The method of claim 1, wherein said modifying the graph includes generating a modification using at least one of 2-opt, simulated annealing, and a genetic algorithm.

19. A non-transitory computer readable storage medium having instructions embodied therewith, the instructions executable by a processor to cause the processor to perform operations comprising:
   obtaining a graph including a plurality of nodes and a plurality of paths between the nodes, the graph representing a system comprising an arrangement of elements;
   generating a data structure in which, for each node pair of the plurality of nodes, a count of the number of paths of length S between the node pair is stored in association with the length S;
   modifying the graph to obtain a modification of the graph related to the count of the number of paths of length S; and
   estimating, based on the data structure and the modification, a change in a characteristic of the graph caused by the modification, the characteristic including an objective function that is quantitatively representative of the connections between the nodes and being indicative of performance of the system.

20. An apparatus comprising:
   a processor operable to execute instructions recorded on a non-transitory computer readable storage medium; and
   a non-transitory computer readable storage medium having instructions embodied therewith, the instructions executable by the processor to cause the processor to perform operations comprising:
      obtaining a graph including a plurality of nodes and a plurality of paths between the nodes, the graph representing a system comprising an arrangement of elements;
      generating a data structure in which, for each node pair of the plurality of nodes, a count of the number of paths of length S between the node pair is stored in association with the length S;
      modifying the graph to obtain a modification of the graph related to the count of the number of paths of length S; and
      estimating, based on the data structure and the modification, a change in a characteristic of the graph caused by the modification, the characteristic including an objective function that is quantitatively representative of the connections between the nodes and being indicative of performance of the system.

* * * * *